Oct. 18, 1966        H. L. HOPKINS        3,279,304

HIGH STRENGTH BLIND FASTENER

Filed July 7, 1965        4 Sheets-Sheet 1

INVENTOR.
HOWARD L. HOPKINS
BY
ATTORNEYS

Oct. 18, 1966         H. L. HOPKINS         3,279,304
HIGH STRENGTH BLIND FASTENER

Filed July 7, 1965                                            4 Sheets-Sheet 2

INVENTOR

HOWARD L. HOPKINS

BY *Hoffmann and Hunt*

ATTORNEYS

Oct. 18, 1966 H. L. HOPKINS 3,279,304
HIGH STRENGTH BLIND FASTENER
Filed July 7, 1965 4 Sheets-Sheet 3

INVENTOR

HOWARD L. HOPKINS

BY Hoffmann and Yount

ATTORNEYS

Oct. 18, 1966   H. L. HOPKINS   3,279,304
HIGH STRENGTH BLIND FASTENER
Filed July 7, 1965                                    4 Sheets-Sheet 4

INVENTOR
HOWARD  L.  HOPKINS
BY Hoffmann and Yount
ATTORNEYS

United States Patent Office 3,279,304
Patented Oct. 18, 1966

3,279,304
HIGH STRENGTH BLIND FASTENER
Howard L. Hopkins, Cleveland Heights, Ohio, assignor to The National Screw & Manufacturing Company, Cleveland, Ohio, a corporation of Ohio
Filed July 7, 1965, Ser. No. 470,159
1 Claim. (Cl. 85—77)

The present invention relates to fasteners, and more particularly to so-called screw or bolt-type blind fasteners. This application is a continuation-in-part of my copending application, Serial No. 831,589, filed August 4, 1959, entitled "Blind Fastener," which application combines the subject matter of application, Serial No. 480,691, filed January 10, 1955, now abandoned, and Serial No. 612,149, filed September 26, 1956, now abandoned, and the specification, drawings, etc., of said applications are incorporated herein by reference.

The principal object of the present invention is the provision of a novel and improved two-piece blind fastener of the screw or bolt-type especially designed as a structural fastener for use in the aero space and automotive industries, but which may be used in other industries, which will be relatively inexpensive to produce, will have high strength and will tightly clamp and fixedly hold together the parts secured thereby.

The invention resides in certain constructions and the provision of certain physical properties in different parts of the fastener as will be hereinafter referred to in the following description of the preferred embodiment of the invention described with reference to the accompanying drawings forming a part of this specification in which similar reference characters designate corresponding parts, and in which FIG. 1 is an expanded view of a fastener embodying the present invention with parts broken away and in axial section;

Figure 1:
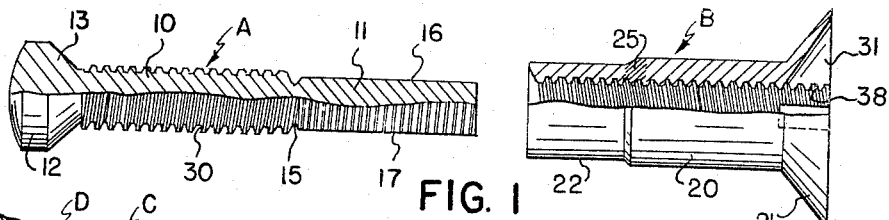
Figure 2:
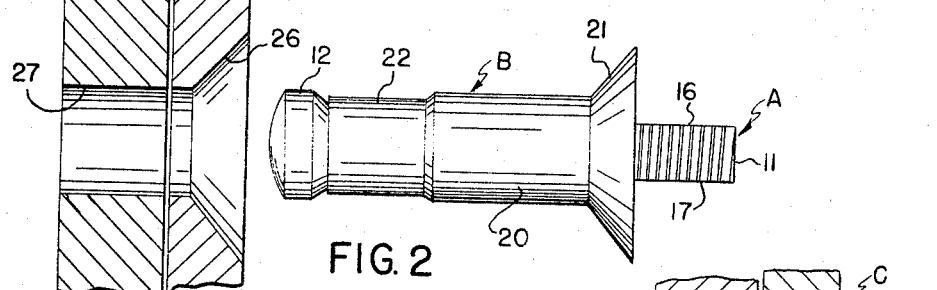
FIG. 2 is an elevational view of the fastener shown in FIG. 1 assembled and in position to be inserted in aligned circular apertures in two slightly spaced members to be secured together by the fastener.
Figure 3:
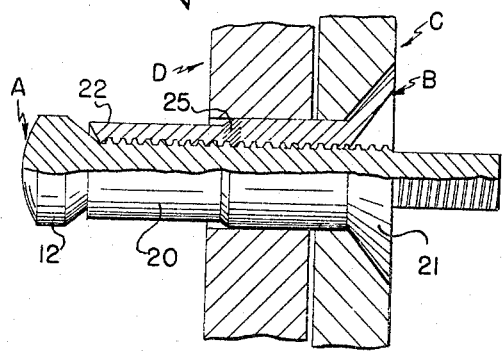
FIG. 3 is a view of the fastener shown in FIG. 1 in driving position in the aligned circular apertures in the two members shown in FIG. 2.
Figure 4:
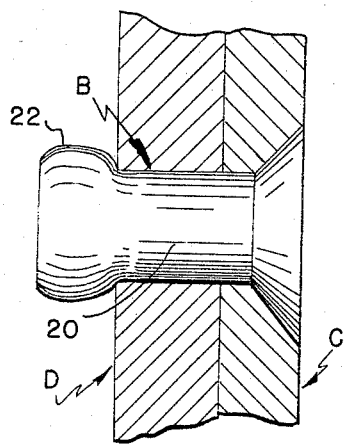
FIG. 4 is a view similar to FIG. 3 but showing the fastener in elevation and after it has been driven with the members secured thereby drawn tight together.
Figure 5:
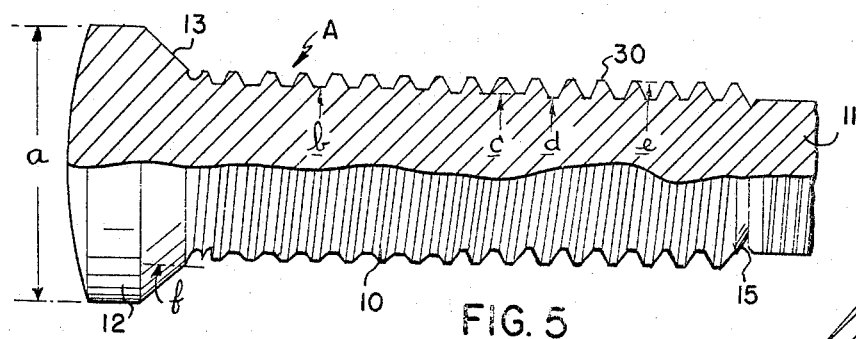
FIG. 5 is an enlarged fragmentary, axial view with portions in elevation of the combination nut and blind head member of the fastener.
Figure 6:
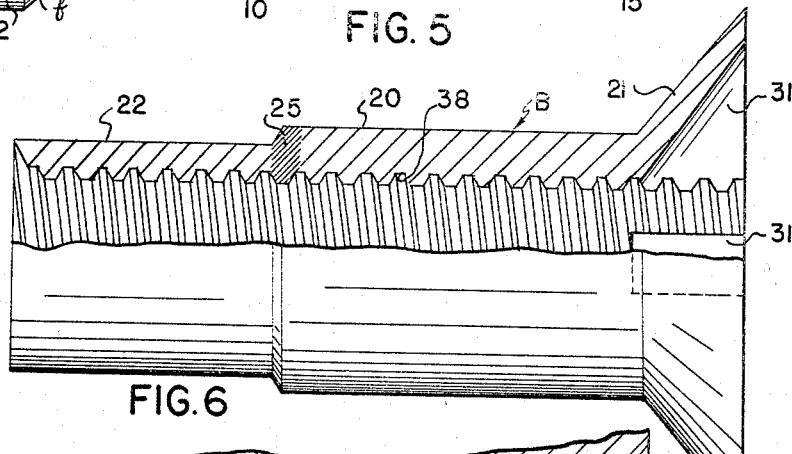
Figure 7:
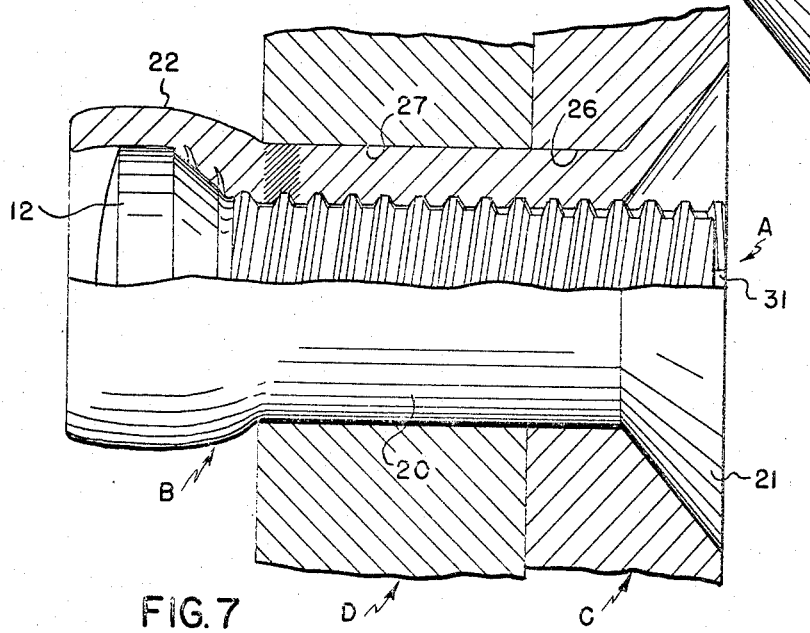
FIG. 7 is an enlarged view similar to FIG. 4 but showing portions in section.

Referring to the drawings, the blind fastener shown in FIGS. 1 to 7 comprises two discrete members, a screw member A and a combination nut and blind head member B. The screw member A comprises a threaded shank 10 having a driving connection 11 at one end and a head 12 at the other, which head has on its shank side an outwardly and rearwardly tapered or conical bearing surface 13. The driving connection 11 is a continuation of the shank proper connected thereto by a section of less effective area than that of the shank proper and therefore of less strength than the strength of the shank proper, which section is formed by a groove 15. The driving connection 11 has two opposite flat sides 16 and 17 and is adapted to be engaged or received in a suitable complementary aperture in a driving tool.

The combination nut and blind head member B comprises an internally threaded cylindrical body portion 20 having a countersunk-type head 21 at one end and a cylindrical portion 22 at the other end of slightly less external diameter than that of the body portion 20. The cylindrical end portion 22 consititutes the blind head part of the fastener and is adapted to be expanded over the conical bearing surface 13 of the head 12 of the screw member A upon relative rotation between the two members A and B incident to driving.

The members A and B, except for the blind head part 22, are made of relatively non-ductile material. The blind head part 22 is made of relatively ductile material with a transition zone 25 between the relatively ductile and non-ductile parts. The member B can be made in various ways as by making the entire member of suitable material and heat treating the same to desired hardness, for example, about Rockwell C scale 39 to 46, and then drawing the blind head part 22 to desired softness, for example, about $R_c$ 20 to $R_c$ 26, or by making the entire member of material of suitable ductility for the blind head part 22, for example, about $R_c$ 20 to 26, and induction hardening an tempering to desired hardness, for example, about $R_c$ 39 to 46, the member except for the blind head part. The transition zone 25 should be kept to a minimum.

Prior to use and preferably at the time of manufacture the members are threaded together with the heads 12 and 21 at opposite ends of the fasteners. In use the assembled fastener is inserted with the screw head 12 leading into aligned holes in members to be screwed together thereby, such as, the holes 26, 27 in the plate-like members C, D. The fastener is inserted from the accessible side of the member or plate C and the lengths of the shank proper of the screw A and the body part 20 of the member B are such that the blind part 22 of the latter projects beyond the inaccessible side of the member or plate D. The blind end of the cylindrical body portion 20, of the member B preferably stops short of the inaccessible side of the member D a small amount or distance. After the fastener is assembled with the members to be secured together thereby in the manner described, the fastener is driven or set by producing relative rotation between the member A and the member B to draw the head 12 of the member A into the blind head part 22 of the member B. This expands or flares, without splitting, the portion of the blind end of the part 22 which extends beyond the non-accessible side of the member D over the tapered or conical bearing face 13 of the head 12 and any portion therewith drawing the members C, D tight together.

The fastener is preferably set by rotating the member A while the member B is held stationary. When the fastener is set in this manner the blind head portion or end of the member B is expanded by relative rotation therebetween and the head 12 of the member A by an operation somewhat analogous to that of metal "spinning." When the fastener is driven to a predetermined tension, the plate-like members C, D are securely drawn and fixed together or clamped between the blind head of the fastener formed by the expanded end or portion 22 of the member B and which blind head engages the non-accessible side of the plate-like member D adjacent thereto, and the accessible head 21 of the member B which engages the exposed side of the plate-like member C, adjacent thereto.

The maximum diameter $a$ of the head 12 of the member A which is preferably about 1.4 to 1.8 times the pitch diameter of the thread 30 of the member A and the maximum diameter of the body portion 20 of the member B are substantially equal, and the hole or holes in the work are such that the fastener can be readily inserted therein by hand but will not be loose therein. The member B, if desired, may be provided with a driving or holding connection or means accessible at the exposed side of the plate C, for example, slots 31 adapted to be engaged by complementary connection on the driving tool. The free end of the portion 11 of the shank 10 of the member A which forms the driving connection normally projects beyond the head 21 of the member B for engagement in a suitable, complementary aperture in the driving tool.

Figure 8:
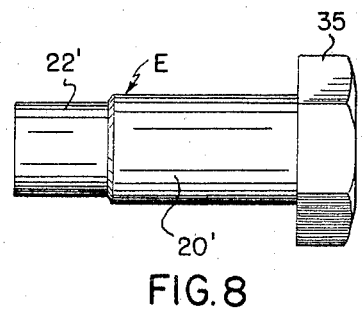
FIGS. 8 and 9 are elevational views of combination nut and blind head members having modified head constructions.
Figure 9:
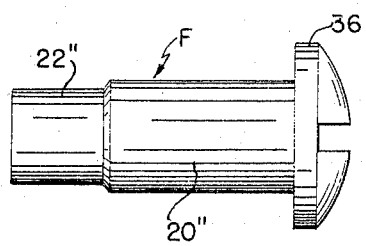

In driving the fastener, the member A is rotated until the driving end portion 11 breaks away from the shank 10 of the member A at the notched section. The notched section is formed by a predetermined area such that it will break when subjected to predetermined torque. This assures driving the fastener to a predetermined torque and the tightening of the fastener to a predetermined stress or load. The head 21 of the member B shown in FIGS. 1 to 7 is of the countersunk type. Combination nut and blind head members E and F similar to the member B but having hexagonal and pan-type heads, designated 35 and 36, respectively, are illustrated in FIGS. 8 and 9. The other parts of the members E and F are designated by the same reference characters as those employed to designate the corresponding parts of the member B but having a prime mark and a double prime mark affixed thereto, respectively. It is to be understood, however, that other types of heads may be employed.

The threaded shanks of the screws or members A and the mating internal threads 38 on the member B, except as otherwise noted herein, are preferably made to standard sizes, for example 4–48, 6–40, 8–36, 10–32, 12–28, etc., Unified Thread sizes, preferably five thread series, Classes 3A and 3B, Screw-Thread Standards for Federal Services, U.S. Department of Commerce, National Bureau of Standards, Handbook H28 (1957). The shank size predetermines, to a large extent, the construction of the other parts, etc., in the embodiment shown, the thread 30 of the member A extends from the free end of the member 11 along the shank to a point adjacent to the head 12. The effective diameter of a short portion or section of the shank 10 adjacent to the head 12 may be increased 1% to 3% with reference to that of the remainder of the shank, if desired, because this portion of the shank is subjected to a complex combination of shear, torsion and tensile stresses and loads, and is the part of the member A most likely to fail.

The threads of the screw part or member B is of the truncated type having a flat root and a flat crown, is preferably formed by thread rolling and in the embodiment shown the root diameter for a short distance from the head, for example, about .125 inch is increased over that of the rest of the threads by grinding off the crests of the threads of the dies along the head edge to produce a thread root diameter $b$ slightly larger than the thread root diameter $c$ of the remainder of the thread, which diameter is slightly greater than the root diameter $d$ of a standard screw of the same size. This is produced by grinding off the crests of the other threads of the dies. The increase, however, is not sufficiently great to cause interference therebetween and the internal mating thread 38 in the member B which is preferably formed with a standard tap. Other types of threads, for example, threads with rounded root and/or rounded crown, may be employed, if desired.

In practice, the fasteners are made in different lengths, each designed to fasten two or more members together having an overall thickness within fairly wide limits. The lengths of the respective parts while being made as short as possible consistent with other requirements in the effort to save weight, etc., are preferably so proportioned that when the bolt is in use or driven, the blind end of the member B projects over the head 12 of the member A. The material of the portion or blind head part 22 of the member B is preferably such, as are the dimensions of the various parts, that as the blind end 22 of the member B is expanded over the head 12 of the member A severe stresses are set up therein which exceed the yield strength of the material but are not great enough to cause the material to take a permanent set at its maximum expansion and as the head 12 moves inwardly beyond the blind end of the member B, relaxation of these stresses in the end which extends beyond the head 12 causes or permits the same to contract slightly over the blind side of the head 12 thereby effectively locking the members A and B together against unthreading. This feature is shown in the drawings, but for purposes of illustration the extent to which the blind end of the nut contracts is exaggerated in the drawings.

Locks other than the lock mentioned may be used for preventing unthreading of the members A and B. A thread interference lock may be provided, for example, by rolling a continuous groove in the body portion of the member B, preferably adjacent to the head but spaced slightly therefrom or by forming circumferentially spaced depressions or indentations at approximately the same location with respect to the head by a suitable tool to thereby decrease the internal diameter of the nut thread underneath the groove or other depressions and thus cause limited portions of the member B to more tightly grip the member A, preferably equivalent to the interference fit defined by H28 Handbook.

Figure 10:
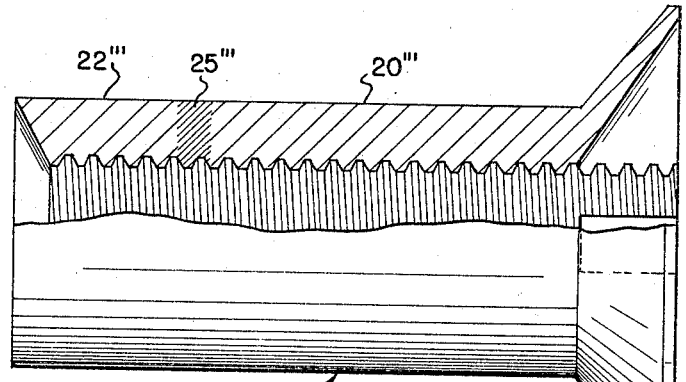
FIGS. 10, 11 and 12 are views similar to FIG. 6 but showing modified constructions.

If the so-called blind head portion or part 22 of the member B is made slightly less in diameter, approximately .5% to 9% less than the diameter of the body portion 20, a much improved drawing together of the members C and D, that is, clamp-up or draw-up action is obtained. In other words, the parts or plates are clamped up tighter, that is, drawn together tighter upon the driving of the fastener than would otherwise be the case. The optimum reduction in the diameter of the blind head portion 22 with respect to the diameter of the main body portion 20 of the member B is approximately 4%, that is, the diameter of the blind head portion should be equal to approximately 96% of the diameter of the body portion, which, as previously stated, should be such that the fastener can be inserted by hand into the apertures in the parts to be secured together but will not be loose therein. The reduction in diameter is exaggerated in the drawings. The blind head part 22, however, may be of the same outside diameter as that of the body portion 20 as illustrated in FIG. 10 in which the corresponding parts are designated by the same reference characters as used in FIGS. 1 to 7, but having triple prime marks affixed thereto.

Figure 11:
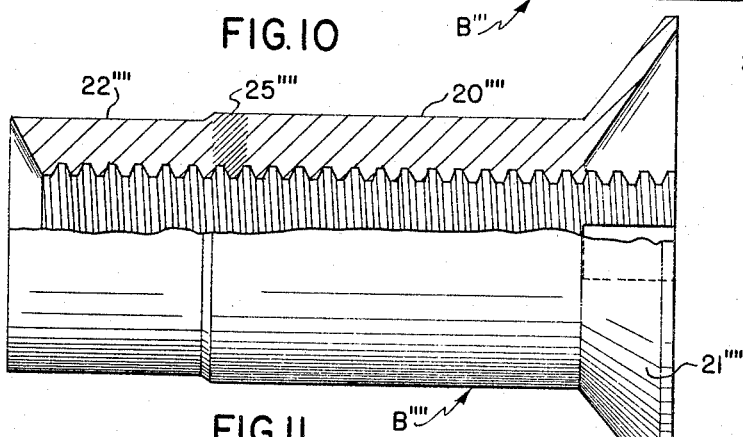
Figure 12:
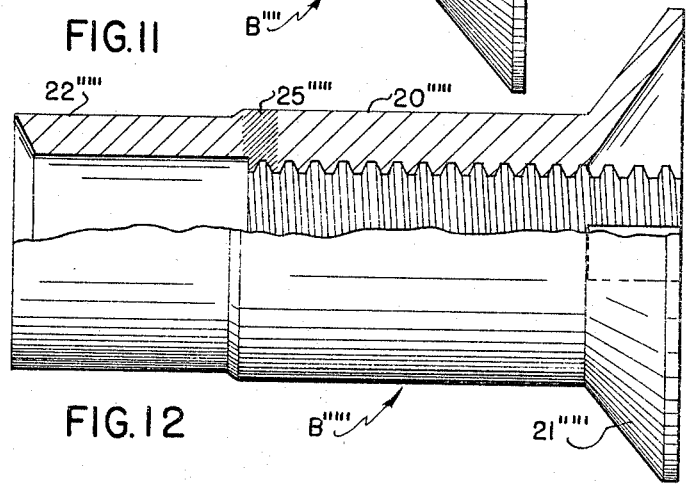

The wall thickness of the cylindrical body portion 20 of the member B measured to the crest of the thread is about 18% to 22% of the outside diameter of the body portion. The internal threads of the blind head part 22 of the member B may be removed, if desired, as by counterboring, as illustrated in FIGS. 11 and 12 in which the corresponding parts are designated by the same reference characters used in FIGS. 1 to 7 but with quadruple and quintuple prime marks affixed thereto, respectively. The wall thickness of the blind head part 22 of the member B should never be less than about 8% to 17% of the outside diameter of the body portion of the member B.

As previously stated, in practice the fasteners are made in different lengths, each designed to fasten two or more members together having an overall thickness within fairly wide limits. These limits are commonly referred to as the maximum and minimum grip lengths of the fastener and the length of the member B less that of the blind head part is preferably approximately equal to the mean grip length less one-fourth of the difference between the maximum and minimum grip lengths. As an example, if the diameter of the body portion of the member B is .250″ the diameter of the blind head end is preferably from about .008″ to .012″ less and if the grip range is .125″ the length of the member B less the blind head part is preferably about .062″ less than the mean grip.

The member A may be made of a heat treatable alloy or carbon steel and the member B of a commercial low carbon steel heat treated to obtain the desired characteristics, for example, ductility, but the member B may be made of any suitable material, such as, aluminum or a corrosion-resistant steel sensitive to cold-working, that is, a steel capable of having its hardness and strength improved by cold-working, for example, AN–QQ–771. As an alternative construction, the member B may be made of hard and nonductile material like the member A and the blind end annealed or otherwise treated to produce the desired characteristics. If desired, the entire fastener may be made of so-called "high temperature" material, that is, material which will withstand temperature up to 2000° F. and more without failure.

For more detailed information respecting suitable materials, reference is made to my aforesaid applications.

The angle $f$ of taper of the conical face 13 of the head 12 of the member A is reasonably critical as the longitudinal and radial forces produced thereby against the end of the blind head part of the member B must be proportioned within the limits of the material used. The angle of the bevel will vary with the hardness of the blind head part of the member B but should be not less than about 30° with reference to the longitudinal axis of the member. The smaller angles are used with the harder materials. The angle $f$ of the member A is 40°.

Figure 13:
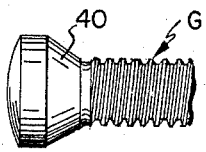
FIGS. 13, 14 and 15 are fragmentary elevational views of screw members having modified head constructions.
Figure 14:
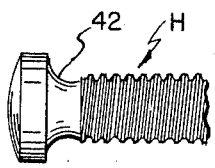
Figure 15:
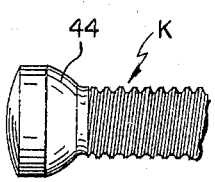

The screw member G shown in FIG. 13 is similar to the corresponding member A shown in FIGS. 1 to 7 except that it has a conical bearing surface 40 which makes an angle of 30° with the longitudinal axis of the member. Alternative bearing surface constructions are illustrated in FIGS. 14 and 15. The bearing surface 42 of the member H, shown in FIG. 14, is concave. In fact the particular bearing surface shown is an arc of a circle, the center of which lies on the circumference of the head extended toward the shank of the screw. Alternatively, this surface could be elliptical with the radius gradually increasing to 90° in an outwardly direction. The bearing surface 44 of the member K, shown in FIG. 15, is convex. Aside from the differences mentioned, the members G, H and K are similar in construction to the member A, previously described in considerable detail. The head configuration shown in FIG. 13 is particularly applicable for relatively hard material; the head configuration shown in FIG. 14 is preferred for soft material and the head configuration shown in FIG. 15 is preferred for medium soft material. Obviously a frusto-conical bearing surface can be used with any material. The diameter $f$ of the head of the member A is preferably about one and three-eighths to about one and three-quarters times that of the mean thread diameter.

For many applications, for example, aero-space, the dimensions of the different parts are not only critical but are held to quite close limits or tolerances, for example, the wall thickness of the cylindrical body portion of the member B and that of the blind head part thereof, the former of which is a function of the relative diameters of the shank of the member A and the head thereof. A number of preferred dimensions for a few representative screw sizes are given for purposes of illustration in the following table in which $e$ is the maximum thread diameter:

| Screw Size | a. | b. | c. | d. | e. |
|---|---|---|---|---|---|
| 4–48 min | .156 | .0938 | .0870 | .0819 | .1075 |
| 4–48 max | .160 | .0965 | .0895 | .0864 | .1120 |
| 6–40 min | .195 | .1146 | .1070 | .1036 | .1320 |
| 6–40 max | .199 | .1183 | .1110 | .1073 | .1380 |
| 10–32 min | .255 | .1502 | .1548 | .1471 | .1840 |
| 10–32 max | .260 | .1627 | .1578 | .1517 | .1900 |
| 12–28 min | .306 | .1807 | .1750 | .1672 | .2095 |
| 12–28 max | .311 | .1832 | .1780 | .1722 | .2160 |
| ¼–28 min | .369 | .2130 | .2080 | .2011 | .2435 |
| ¼–28 max | .374 | .2165 | .2120 | .2062 | .2500 |

Among the advantages of the present fastener is the fact that the members secured together thereby are held between two heads, that is, the external or nonblind head and the internal or blind head, both of which heads are an integral part of the same member, that is, the member B. With this construction there is not a total failure or loss of holding effect in the event the head of the member A breaks off subsequent to driving. The fact that one of the heads, that is, the blind head is relatively soft and resilient results in the fastener being less liable to fail as, for example, when subjected to vibration including supersonic vibration because the resiliency, however limited, absorbs some of the strain. The slight contraction of the free end of the blind head part about the head of the member A, as previously explained, is usually sufficient to retain the blind part of a broken member A assembled with the member B in the event the member A breaks subsequent to driving. This prevents the broken part of the member A from dropping into the interior of the structure in which the fastener is driven and being loose therein.

From the foregoing description of the preferred embodiments of the invention, it will be apparent that the objects heretofore enumerated and others have been accomplished and that there has been provided a novel and improved two member, so-called blind fastener or bolt. While the preferred embodiment of the invention has been described in considerable detail, the invention is not limited to the precise constructions shown. My intention is to cover hereby all adaptations, modifications and uses of the fastener shown which come within the practice of those skilled in the art to which the invention relates and within the scope of the appended claims.

Having described my invention, I claim:

A high strength blind fastener for securing together a plurality of structures accessible from only one side and having aligned circular apertures therein forming a passageway therethrough, said fastener consisting of merely two discrete members:

(1) a screw or bolt member made of relatively nonductile material having a hardness of about $R_c39$ to $R_c46$ and comprising:
   (a) a threaded shank portion,
   (b) a circular head portion at one end of said shank and formed integral therewith,
   (c) a bearing surface on the shank side of said head portion inclined outwardly away from said shank portion at an obtuse angle to the axis of said shank at an angle of about 120° to 160°,
   (d) said shank portion being of such length that said circular head portion will be located behind the nonaccessible side of the structures with which the fastener is used when the fastener is assembled in the aligned apertures through the structures in position for driving,
   (e) a driving connection portion at the end of said shank portion opposite to said circular head portion, and
   (f) a sheer portion having less strength than the strength of said driving connection portion and said shank portion connecting said driving connection portion to said shank portion; and (2) a one-piece combination nut and blind head member of less length than said screw or bolt member and comprising:
   (a) an internally threaded cylindrical tubular body portion threaded onto said shank portion of said screw or bolt member,
   (b) said tubular body portion having an outside diameter substantially equal to the diameter of said round head portion of said screw or bolt member and a wall thickness measured to the crest of the thread of about 18% to 22% of its outside diameter,
   (c) a head portion at the end of said tubular body portion remote from said round head portion of said screw or bolt member, said head portion being integral with said tubular body portion, (d) said tubular body portion and said head portion being made of relatively nonductile material having a hardness of about $R_c$ 39 to $R_c$ 46, (e) a circumferentially continuous cylindrical tubular blind head portion made of relatively ductile material integral with the end of said tubular body portion opposite to said head portion, (f) said blind head portion being made of relatively ductile material having a hardness of about $R_c$ 20 to $R_c$ 26 and a wall thickness less than the wall thickness of said tubular body portion but not less than about 8% thereof, (g) said combination nut and blind head member being of such length that said blind head portion projects beyond the nonaccessible side of the structures when the fastener is assembled in the aligned apertures through the structures with said head portion of said combination nut and blind head member in engagement with the nonaccessible side of the structures, (h) said tubular body portion being of such length that its end opposite to its said head portion does not project beyond the nonaccessible side of the structures when the fastener is assembled in the aligned apertures through the structures with said head portion of said combination nut and blind head member in engagement with the accessible side of the structures pereparatory to driving, (i) whereby said blind head portion will be expanded into a head at the nonaccessible side of the structures with which the fastener is used integral with said tubular body portion of said combination nut and blind head member upon said screw or bolt member being rotated relative to said combination nut and blind head member with the fastener assembled in the aligned apertures through the structures as aforesaid.

References Cited by the Examiner

UNITED STATES PATENTS

| 2,030,168 | 2/1936 | Miller | 85—70 |
| 2,406,157 | 8/1946 | Nelson | 85—77 |
| 2,525,117 | 10/1950 | Campbell | 85—77 |
| 2,612,073 | 8/1952 | Taylor | 85—77 |
| 2,974,558 | 3/1961 | Hodell | 85—77 |
| 3,203,303 | 8/1965 | Laisy | 85—77 |

FOREIGN PATENTS

| 928,122 | 5/1947 | France. |
| 567,274 | 2/1945 | Great Britain. |

CARL W. TOMLIN, *Primary Examiner.*

EDWARD C. ALLEN, *Examiner.*

R. S. BRITTS, *Assistant Examiner.*